United States Patent
Hughes et al.

(10) Patent No.: US 10,629,417 B1
(45) Date of Patent: Apr. 21, 2020

(54) SPUTTER ION PUMP WITH PENNING-TRAP CURRENT SENSOR

(71) Applicant: ColdQuanta, Inc., Boulder, CO (US)

(72) Inventors: Steven Michael Hughes, Louisville, CO (US); Farhad Majdeteimouri, Broomfield, CO (US)

(73) Assignee: ColdQuanta, Inc., Boulder, CO (US)

( * ) Notice: Subject to any disclaimer, the term of this patent is extended or adjusted under 35 U.S.C. 154(b) by 180 days.

(21) Appl. No.: 15/366,635

(22) Filed: Dec. 1, 2016

(51) Int. Cl.
*H01J 41/12* (2006.01)
*G05B 19/048* (2006.01)
*G05B 19/04* (2006.01)

(52) U.S. Cl.
CPC ............ *H01J 41/12* (2013.01); *G05B 19/041* (2013.01); *G05B 19/048* (2013.01); *G05B 2219/41383* (2013.01)

(58) Field of Classification Search
CPC ................ G05B 19/041; G05B 19/048; G05B 2219/41383; H01J 41/12
USPC .......................................................... 417/50
See application file for complete search history.

(56) References Cited

U.S. PATENT DOCUMENTS

| | | | | |
|---|---|---|---|---|
| 2,967,257 A | * | 1/1961 | Milleron | H01J 41/20 417/49 |
| 3,018,944 A | * | 1/1962 | Zaphiropoulos | H01J 41/20 417/49 |
| 3,112,863 A | * | 12/1963 | Brubaker | H01J 41/20 417/49 |
| 3,391,303 A | * | 7/1968 | Hall | H01J 41/20 315/108 |
| 3,460,745 A | * | 8/1969 | Lamont, Jr. | H01J 41/20 417/49 |
| 3,528,034 A | * | 9/1970 | Yonts | H05H 1/16 332/141 |
| 4,769,101 A | * | 9/1988 | dos Santos Pereiro Ribeiro | H01J 37/32055 118/50.1 |
| 8,453,493 B2 | * | 6/2013 | Wall | G01N 27/62 73/31.05 |

* cited by examiner

*Primary Examiner* — Patrick Hamo
*Assistant Examiner* — Joseph S. Herrmann
(74) *Attorney, Agent, or Firm* — Clifton Leon Anderson (57) ABSTRACT

A sputter-ion-pump system includes a sputter ion pump and an electronic drive. The electronic drive supplies a voltage across the ion pump to establish, in cooperation with a magnetic field, a Penning trap within the ion pump. A current sensor measures the Penning-trap current across the Penning trap. The Penning trap is used as an indication of pressure within the ion pump or a vacuum chamber including or in fluid communication with the ion pump. The pressure information can be used to determine flow rates, e.g., due to a load, outgassing, and/or leakage from an ambient.

15 Claims, 6 Drawing Sheets

CALIBRATED PRESSURE DETERMINATION PROCESS 500

CALIBRATE PUMP AND/OR VACUUM SYSTEM SO THAT ION-PUMP/VACUUM-CHAMBER PRESSURE CAN BE DETERMINED BASED ON PENNING-TRAP CURRENT (& MAGNETIC FIELD STRENGTH)
501

APPLY DRIVE VOLTAGE TO ESTABLISH PENNING TRAP 502

MONITOR PENNING-TRAP CURRENT 503

DETERMINE ION-PUMP/VACUUM-CHAMBER PRESSURE FROM PENNING-TRAP CURRENT
504

FIG. 5

FLOW-RATE DETERMINATION PROCESS 600

APPLY DRIVE VOLTAGE TO ESTABLISH PENNING TRAP 601

MONITOR PENNING-TRAP CURRENT TO COLLECT PLURAL TIME-STAMPED VOLTAGE-CURRENT DATAPOINTS
602

DETERMINE PRESSURE CHANGE (FLOW) RATE FROM CHANGES IN PENNING-TRAP CURRENT
603

SPUTTER ION PUMP WITH PENNING-TRAP CURRENT SENSOR

BACKGROUND

Cold and ultra-cold matter physics (e.g., optical traps, magneto-optical traps (MOTs), ion traps, laser cooling, and Bose-Einstein Condensates) has spurred demand for compact high vacuum (HV) and ultra-high vacuum (UHV, e.g., from about $10^{-9}$ torr to about $10^{-13}$ torr) systems. At these pressures, the mean free path of a gas molecule is on the order of 40 kilometers (km), so gas molecules typically collide with chamber walls many times before colliding with each other. For this reason, almost all interactions take place on chamber walls and other surfaces within a UHV chamber.

Several vacuum technologies may be used together to establish UHV. For example, a UHV cell may be baked at high temperatures to release particles prior to establishing UHV. Various pumping technologies can be used to establish UHV. However, UHV can degrade as particles are introduced intentionally (e.g., as part of an experiment) or unintentionally (e.g., by effusion from or diffusing through vacuum cell walls), so an active pumping technology is needed to maintain UHV. Sputter ion pumps are currently the most desirable and mature technology for actively maintaining UHV in a compact cell.

Herein, "sputter ion pump" (aka, "ion sputter pump") refers to any system that removes mobile molecules (including single-atom molecules) from a local (incomplete) vacuum by: 1) ionizing the molecules to yield ions; 2) immobilizing the ions by sorbing (adsorbing or absorbing) them to a "getter" material; and 3) burying the ions with material sputtered from a cathode. Herein, "molecule" refers to the smallest particle in a chemical element or compound that has the chemical properties of that element or compound. A typical ion pump makes use of a Penning trap constituted by an electric field and a magnetic field. The electric field gives rise to free electrons at a cathode and accelerates them toward an anode. A cross product of the magnetic field with the electric current associated with the accelerating electrons produces a force orthogonal to the electron path. In a cylindrical geometry, this force diverts the electrons so that they form a swirling cloud.

The resulting cloud of swirling electrons ionizes incident molecules, which are then accelerated by the electric fields so that they impact surfaces of getter material to which the ions are adsorbed. In addition, some molecules, e.g., of hydrogen and noble gases, most significantly, helium, may be absorbed by the getter material. In a sputter ion pump, getter material may be liberated ("sputtered") from the getter surface and then re-deposited, burying sorbed molecules and renewing the getter surface. In contrast to other common UHV pumps, such as turbo-molecular pumps and diffusion pumps, ion pumps have no moving parts and use no oil. They are therefore clean, need little maintenance, and produce little or no vibration.

Efforts are underway to make more compact UHV systems. UHV systems tend to be incorporated in other systems, the dimensions of which may scale with the size of the UHV system. A smaller UHV system will enable the incorporating systems to be more portable and less expensive. However, it is a challenge to maintain the ion-pump effectiveness at smaller dimensions. Therefore, it has become increasingly important to minimize the barriers to pumping effectiveness in compact UHV systems.

DETAILED DESCRIPTION

A sputter ion pump requires a voltage, e.g., between an anode and a cathode, great enough to establish and maintain a Penning trap and low enough to avoid arcing. As ion pumps get smaller, the range of voltages between the minimum to maintain the Penning trap and the maximum that avoids arcing becomes smaller. More precise control of the drive voltage is required to ensure it remains within its limits, which may change over time.

In accordance with the present invention, an ion-pump system includes a closed-loop electronic drive that sets and/or adjusts a drive voltage to optimize vacuum pressure or pumping at least as a partial function of the measured Penning-trap current (the current through the circuit to which the drive voltage is applied). This obviates the need for a system separate from the drive system for monitoring the ion pump, allowing for a simpler, more cost-effective, smaller, and more reliable ion-pump system. In addition, the invention provides for automated handling of a number of pump-related performance-optimizing and diagnostic tasks.

The relations among pressure, voltage, and current are affected by the strength of the magnetic field used to confine electrons to the Penning trap. Accordingly, changing the magnetic field can shift an optimal voltage to minimize the attainable pressure and/or to space it further from levels that risk arcing or instability of the Penning trap. Since the magnetic strengths required for small ion-pump dimensions are beyond the practical reach of electro-magnets, changing magnetic field strengths can be accomplished by automated or manual mechanical swapping of permanent magnets. Therefore, changing magnetic fields may be limited to off-line contexts. In some embodiments, permanent magnets are combined with electromagnets to provide for fine tuning of the drive function. Specific uses of magnetic strength control are discussed further below.

Figure 1:
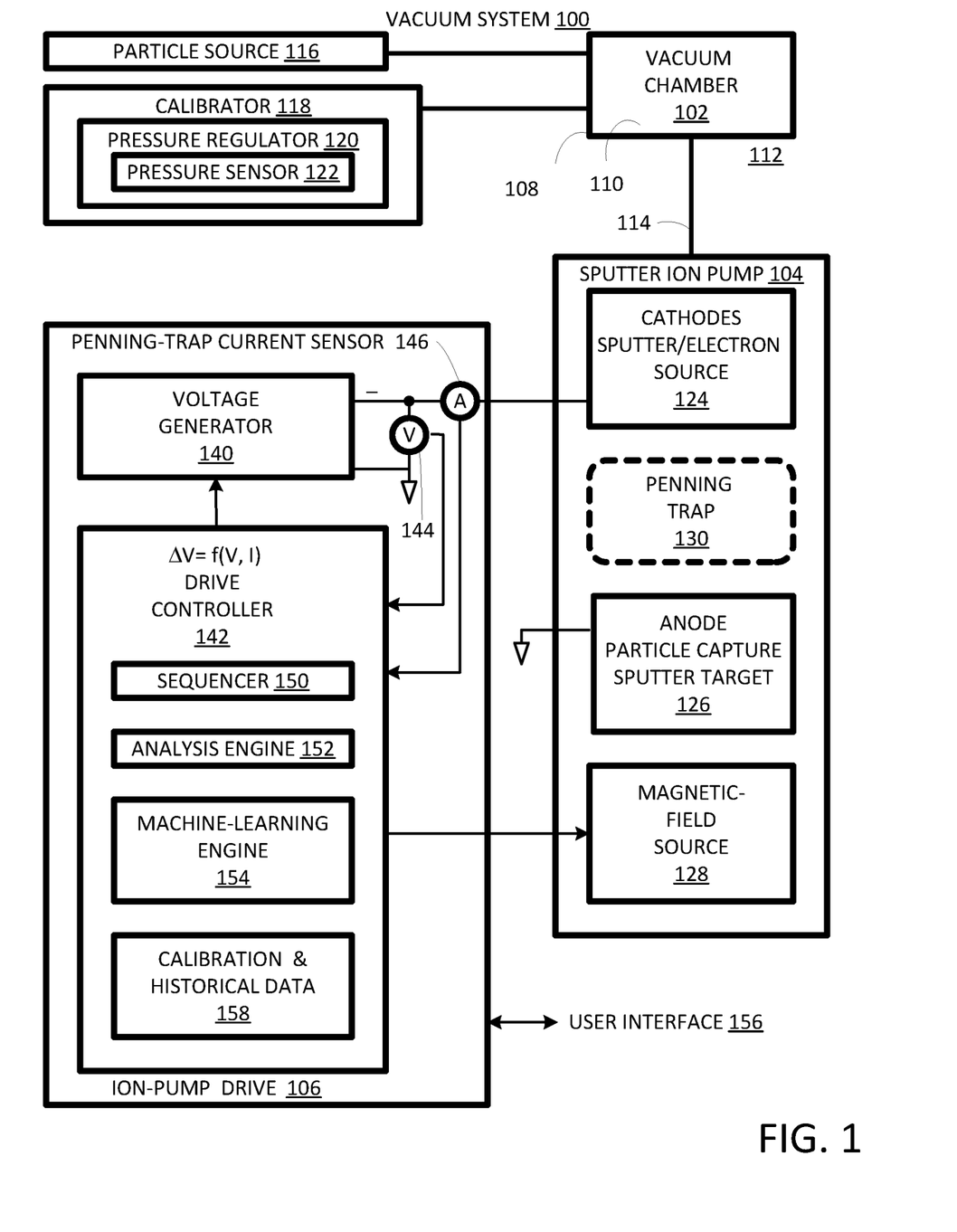
FIG. 1 is a schematic view of a sputter ion-pump system in accordance with the invention.

As shown in FIG. 1, an ion-pump system 100 includes a vacuum chamber 102 (see U.S. Pat. No. 9,117,563 B2 for additional examples of vacuum chambers and sputter ion pumps), a sputter ion pump 104 and an ion-pump drive 106. In some embodiments, a sputter ion pump is part of a vacuum chamber rather than being a separate component in fluid communication with a vacuum chamber. Vacuum chamber 102 has a wall 108 that serves to isolate and maintain a pressure differential between an internal vacuum cavity 110 and an external ambient 112. In variations, the vacuum cavity can include various features, e.g., an atom chip, and optical elements to contribute to the detection, interrogation, and manipulation of particles within the vacuum cavity.

Vacuum cavity 110 is in fluid communication with sputter ion pump 104 via a fluid flow channel 114. Thus, pressure build-up within chamber 102 generally results in a particle flow into pump 104. Vacuum system 100 may also be configured so that vacuum cavity 110 is in fluid communication with a particle source 116 and/or a calibrator 118. However, calibrator 118, which includes a pressure regulator 120 with a pressure sensor 122, may be removed so that it is not present during normal operation.

Sputter ion pump 104 is designed to maintain a pressure of $10^{-2}$ torr to $10^{-12}$ torr within itself and within vacuum chamber 102. Pump 104 includes cathodes 124 and an anode 126 between which an electric field can be established. In practice, cathodes 124 are located on opposite sides of anode 126. Pump 104 also includes a magnetic source 128 for producing a magnetic field. The electric and magnetic fields can cooperate to establish a Penning trap 130.

Electrons emitted from cathodes 124 move within boundaries defined by Penning trap 130 so that they are available to ionize particles, e.g., particles from vacuum chamber 102. Ionized particles are accelerated toward and sorbed to anode 126. Material sputtered from cathodes 124 can bury and, thus, trap particles sorbed to anode 126, thus lowering the pressure within pump 104. The pressure lowering enables a continuous flow of particles from vacuum chamber 102, thus providing for a continual low pressure within.

Ion-pump drive 106 provides and controls the electric field required to establish and maintain Penning trap 130. To this end, ion-pump drive 106 includes a voltage generator 140 and a drive controller 142. Drive controller 142 dictates the drive voltage applied between cathodes 124 and anode 126. A relatively negative voltage is applied to cathodes 124, which serves as the electron source, and a relatively positive voltage is applied to anode 126. In the illustrated embodiment, anode 126 is held to ground since anode 126 is exposed as part of the ion-pump housing. Thus, ion-pump drive 106 applies a negative voltage to cathodes 124.

Ion pump drive 106 includes a voltage sensor 144 to provide feedback to drive controller 142 to enable it to regulate the drive voltage; the regulation can involve adjusting the drive voltage according to a function of voltage and current of the form $\Delta V = f(V, I)$, where V is the present voltage, $\Delta V$ is adjustment, and I is the Penning-trap current. Ion-pump drive 106 also includes a high-precision "Penning-trap" current sensor 146 to measure the current through the drive circuit. For any given drive voltage (and magnetic field strength), the current correlates with pressure in the ion pump. Thus current readings from sensor 146 can be used for pressure measurements. Changes in pressure can be used to determine flow rates e.g., from vacuum chamber 102 into ion pump 104.

While current correlates with pressure, something more is generally needed to find out what that correlation is. Accordingly, calibrator 118 with pressure sensor 120 can be attached to vacuum chamber 102 so that the pressure determinations based on current readings can be calibrated against the readings from sensor 120. Once this is done, pressure sensor 120 can be removed, e.g., to permit a particle source 116 to be connected to vacuum chamber 102. For several applications, e.g., where it is the relative rather than absolute pressure that is of interest, calibration may not be necessary. For example, to identify a vacuum leak, it is only necessary to detect that the pressure is rising (without an alternative explanation).

Drive controller 142 includes a sequencer 150 for causing voltage generator 140 to output sequences of drive voltages according to a schedule or algorithm. For example, during calibration, sequencer 150 can dictate a sequence of voltages at which currents and pressure measurements, e.g., from pressure sensor 120, can be compared. During start up, voltages can be stepped up and down to find an optimal or other stable operating point. At other times, the sequencer can be used shut the drive voltage on and off to assess particle flow and vacuum leakage, as explained in greater detail below. In some embodiments, sequencer 150 is used to step through magnetic-field strengths through control of magnetic-field source 128.

An analysis engine 152 of drive controller 142 provides for analyzing and summarizing data collected, e.g., from the various sensors. For example, analysis engine can provide conversion functions for determining pressure from current for a given drive voltage on a given pump with a given magnetic field strength and geometry. During the aforementioned leakage testing, analysis engine can determine flow, e.g., leakage, rates from a series of temporally spaced voltage-current (and, in some embodiments, magnetic-field strength) datapoints.

A machine-learning engine 154 can be programmed with performance criteria and then operated to use search algorithms, e.g., trial-and-error and dithering, to find optimal drive voltage settings. In addition, machine-learning engine 154 can monitor user behavior, e.g., via user interface 156. Over user interface 156, a user can adjust voltage settings, adjust programming of sequencer 150, set performance parameters for machine-learning engine 154, and monitor readings provided by drive controller 142.

Calibration and historical data 158 can be stored by drive 106 for its use. Calibration data can be generated during calibration, e.g., by calibrator 118 to establish a conversion between voltage, current and magnetic-field-strength data on the one hand and pressure measurements by pressure sensor 122. The calibration data permits vacuum system 100 to provide pressure measurements in standard units such as torr for a range of stored pre-calibrated pump geometries, magnetic fields, and other factors. Historical data can include voltage, current and magnetic-field settings that, in the past, have caused a Penning trap to become unstable or collapse or have resulted in arcing. Such historical data can be used to set limits on searches for optimal voltage settings.

Figure 2:
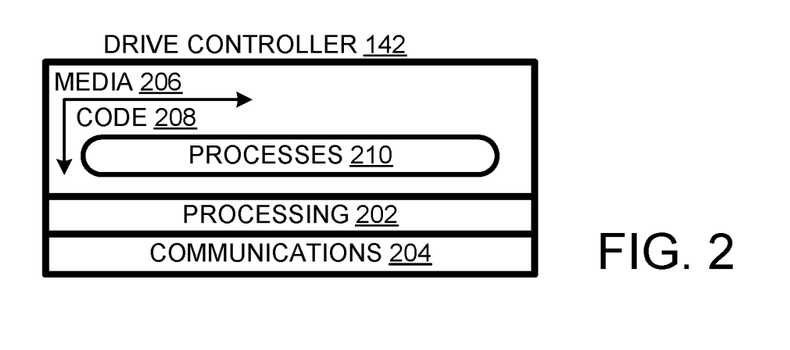
FIG. 2 is a schematic view of a drive controller of the sputter ion-pump system of FIG. 1.

Viewed as a computer, drive controller 142 includes, as shown in FIG. 2, a processor 202, communications devices 204, and non-transitory media 206. Media 206 is encoded with code 208 that, when executed by processor 202, causes vacuum system 100 (FIG. 1) to selectively implement processes 210. Specific examples of processes 210 are detailed below with respect to FIGS. 3-9.

Figure 3:
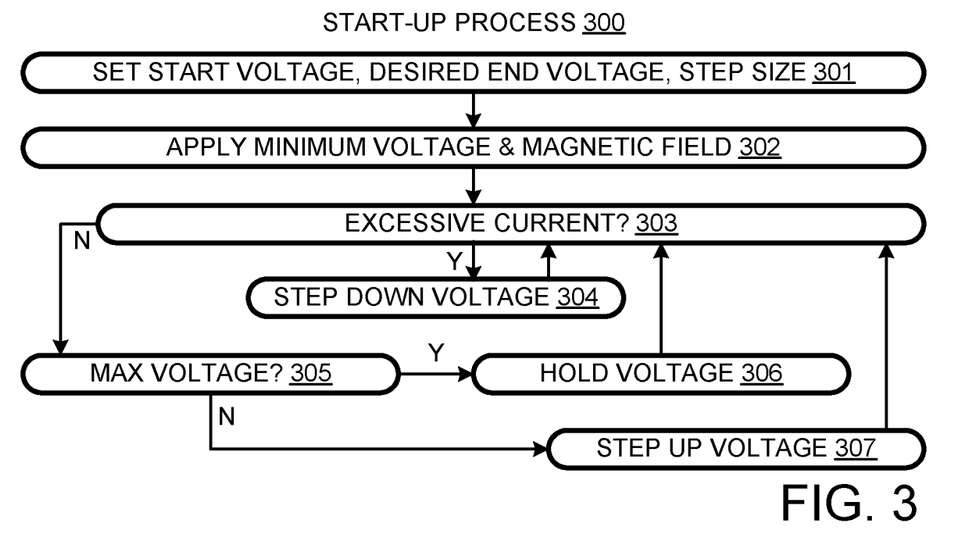
FIG. 3 is a flow chart of a start-up process applicable to the sputter ion-pump system of FIG. 1.

Processes 210 include start-up process 300, flow charted in FIG. 3. At 301, a start voltage, a desired end voltage, and a step size are set, e.g., by a user. At 302, a magnetic field and the first, minimum, voltage are generated and applied to the ion pump. In process 300 and other processes described herein, a magnetic field is applied along with the voltage to establish and maintain a Penning trap. At 303, a determination is made whether or not the resulting Penning-trap current is excessive. If the current is excessive, the voltage is stepped down at 304, and process 300 returns to 303 to see if the current is still excessive.

If at 303, it is determined that the current is not excessive, then at 305, it is determined whether or not the voltage is at the desired maximum/end voltage. If the voltage is at maximum, the voltage is held at 306 and process 300 returns to 303 to check if the current is excessive. If at 305, it is determined that the voltage is not at the maximum desired voltage, then, at 307, the voltage is stepped up, and process 300 returns to 303 to check if the current is excessive.

Figure 4:
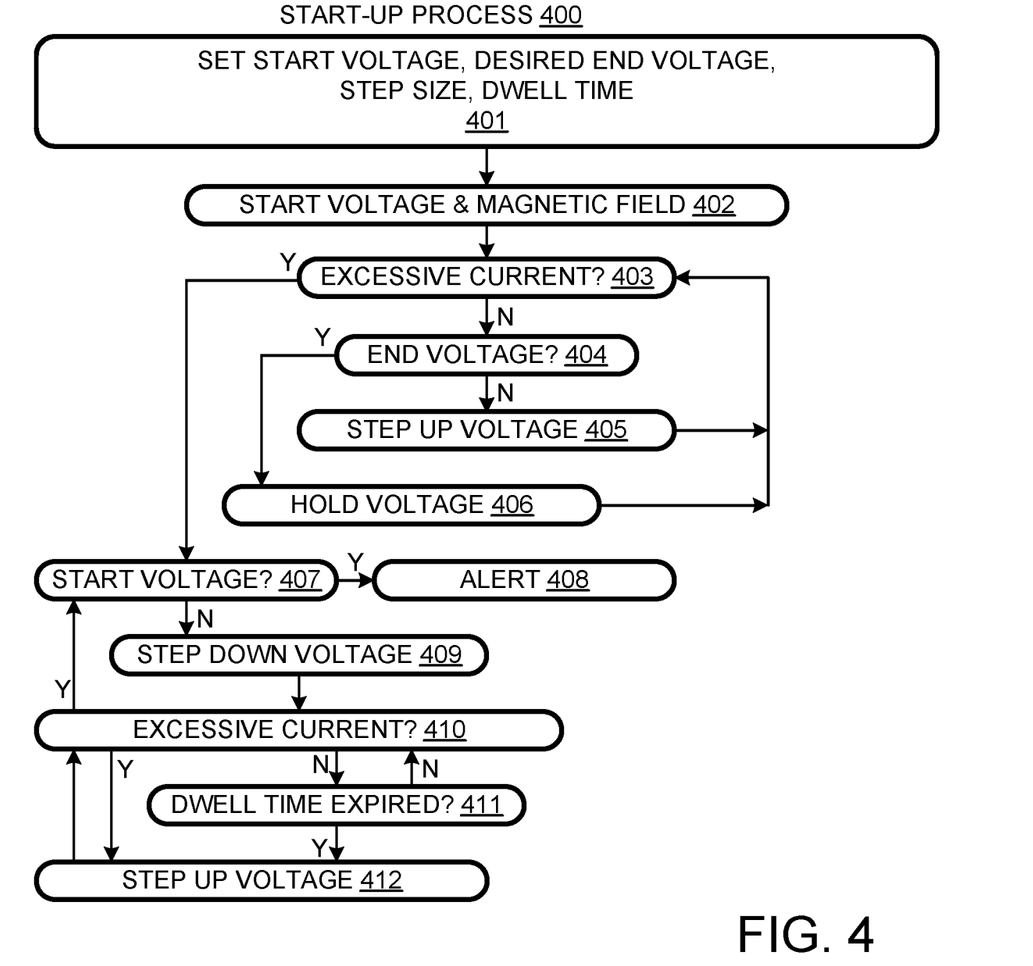
FIG. 4 is a flow chart of another start-up process applicable to the sputter ion-pump system of FIG. 1.

An alternative start-up process 400 is flow-charted in FIG. 4. At 401, a start voltage, a desired end voltage, a step size, and a dwell time are programmed or otherwise set. At 402, the start voltage is applied to the ion pump; the voltage differential cooperates with a magnetic field to establish and maintain a Penning trap. At 403, a determination is made whether the Penning-trap current is excessive, e.g., above a predetermined threshold. If not, then at 404, a determination is made whether or not the present voltage is the desired end or "maximum" voltage. If not, then at 405, the voltage is stepped up the amount of the set step size, and process 400 returns to 413 to check if the current is excessive. If, at 404, it is determined that the voltage is at the desired maximum, then, at 406, the present voltage is retained and process 400 returns to 403 for another current check.

If at 403, it is determined that the Penning-trap current is excessive, then a determination is made at 407 whether or not the present voltage is the start or minimum voltage. If the determination is that the voltage is at the minimum, then an alert is set at 408. Also, an alert is sent if, at any time, the current falls to zero or is other insufficient, indicating instability or a collapse of the Penning trap. In respond to an alert, the operation of the ion pump may be ceased. In other embodiments, other courses of action are taken in response to an excessive current at minimum voltage. These actions may include adjusting magnetic field geometry, decreasing magnetic field strength, attaching a higher current limited driver for high-load pumping, or otherwise affecting changes to the pump to recover stable operation.

If at 407, it is determined that the voltage is above and not at the minimum voltage, the voltage is stepped down at 409. Then, at 410, a check is made to determine if the Penning-trap current is excessive. If the current is not excessive, then, at 411, a determination is made whether the dwell time since the voltage was stepped down at 409 has expired. If not, process 400 returns to 410 to monitor the current. If the dwell time has expired, then at 412, the voltage is stepped up and process 400 returns to 410 to check the Penning-trap current. If at 410, the current is determined to be excessive, process 400 returns to 407 to determine if the voltage is the minimum voltage.

Figure 5:
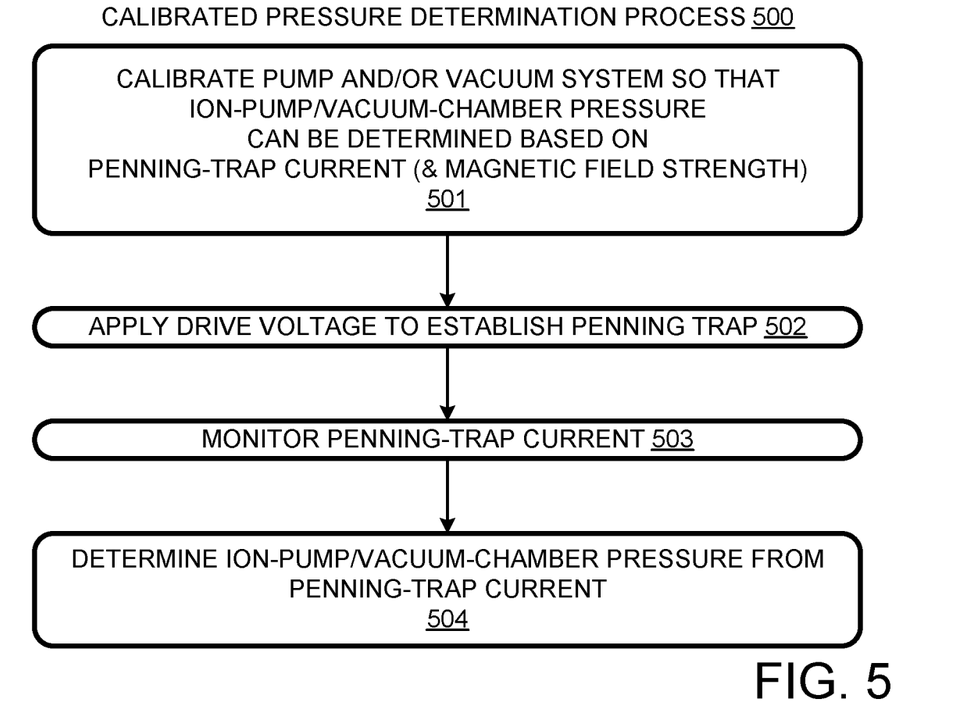
FIG. 5 is a flow chart of a calibrated pressure-determination process applicable to the sputter ion-pump system of FIG. 1.

Process 500 of processes 210 is flow-charted in FIG. 5. At 501, a vacuum system or at least the sputter ion-pump and drive are calibrated so that pressure (in pump or vacuum chamber) can be determined from measured current. At 502, a drive voltage is applied to the ion pump to establish a Penning trap. At 503, the Penning-trap current is monitored to obtain voltage-current (and, in some embodiments magnetic field strength) datapoints. At 504, pressure is determined from calibration data and the datapoints. Depending on the vacuum application, the pressure data may be required by the application or it may be used to detect leakage, to optimize settings, or to monitor for other possible problems.

Figure 6:
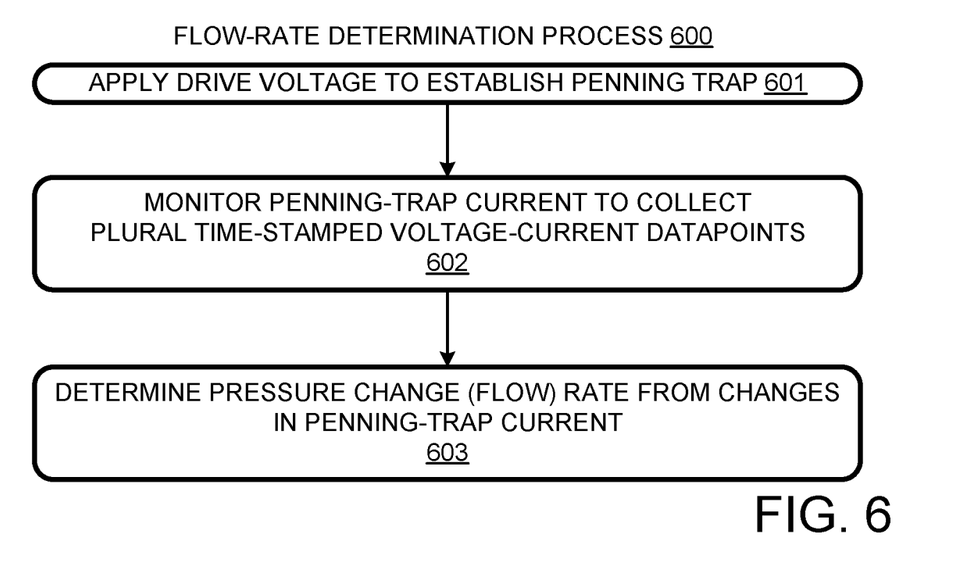
FIG. 6 is a flow chart of a flow-rate determination process applicable to the sputter ion-pump system of FIG. 1.

Even if a vacuum system is uncalibrated so that pressure cannot be determined in standard units for pressure, useful information regarding pressure and flow rates can be discerned from current data. For example, a flow-rate determination process 600 is flow-charted in FIG. 1. At 601, a drive voltage is applied across a sputter ion pump to establish a Penning trap. At 602, the resulting Penning-trap current is monitored, e.g., using a current sensor that taps into the drive circuit. Plural time-stamped voltage-current datapoints are collected. In other words, each datapoint includes a time of collection, a drive voltage value, and a measured current value.

At 603, datapoints can be compared to determine pressure-change rates, i.e., flow rates. If the system is suitably calibrated, the pressure range rate(s) can be determined in standard pressure units, e.g., torr. Otherwise, the pressure changes and flow rates can be evaluated relative to such change rates occurring at other times in the same or a similar system.

Figure 7:
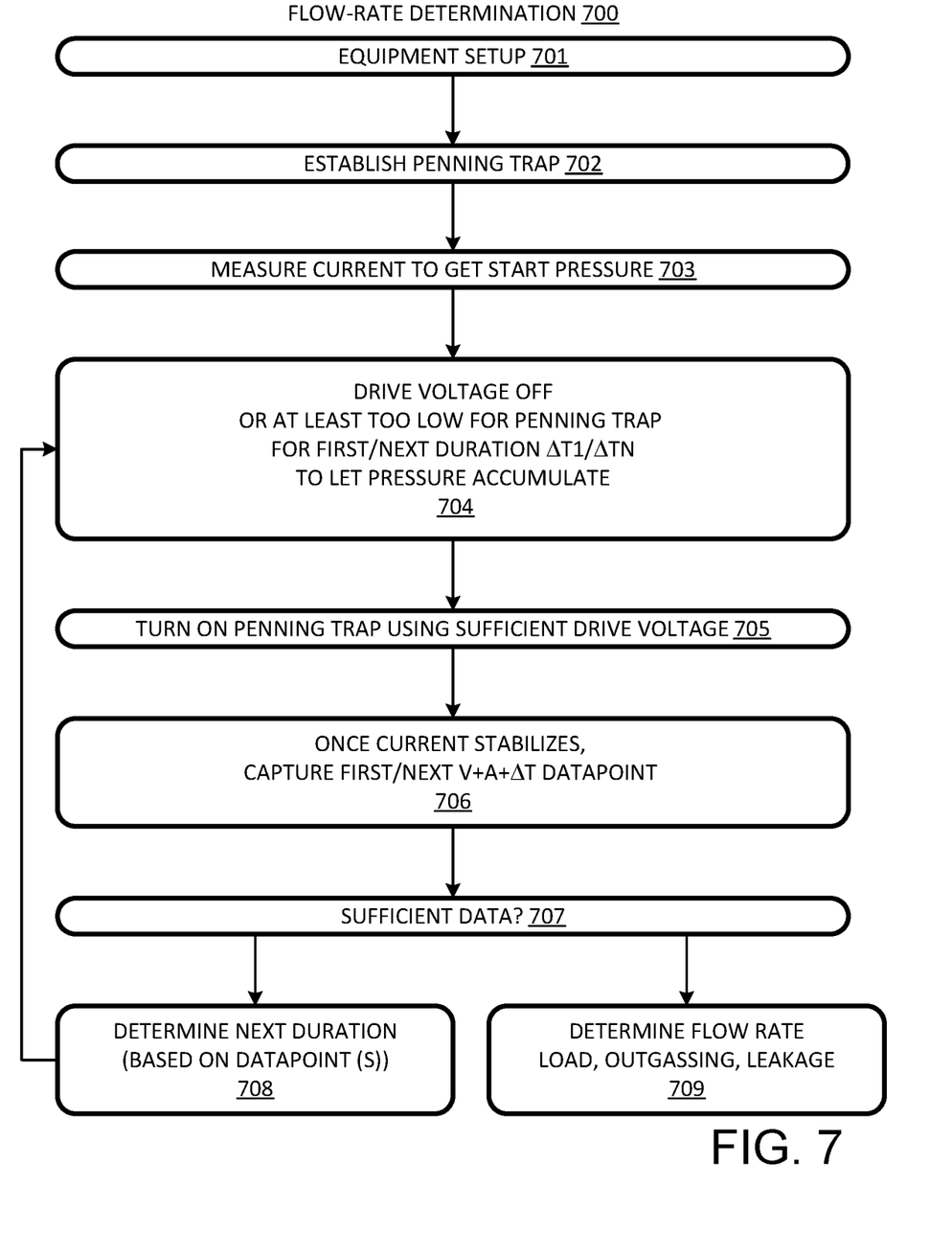
FIG. 7 is a flow chart of another flow-rate determination process applicable to the sputter ion-pump system of FIG. 1.

When very precise assessments of flow rates are required, process 700 of FIG. 7 can be used. At 701, vacuum equipment is set up. This can involve attaching or disconnecting (or otherwise isolating) a material source from the vacuum chamber, or adding the source. In addition, a selected magnetic source can be installed. The total flow can have several components, including an intentionally introduced "load" (e.g., from an alkali metal dispenser), leakage (e.g., gas via micro fractures between the vacuum and the ambient, and heat-enhanced diffusion through walls and other structures, and out-gassing (gas that effuses from components such as feedthroughs and getter material, especially as the components are warmed). Process 700 can be run more than once, e.g., first to measure leakage and outgassing to obtain a baseline, and second with a load. The flow due to the load can then be determined by subtracting the flow due to the leakage and outgassing from the total flow.

At 702, a Penning trap is established, e.g., by setting the drive voltage to an appropriate level. At 703, while the Penning trap is established, the Penning trap current can be measured to obtain a datapoint indicating the current or, in a calibrated system, the pressure (or both) at the time the data point is captured.

The state at 704 has no Penning trap for an extended duration, e.g. from one hour to a day or more to allow pressure to build. To this end, the drive voltage can be off or otherwise too low to support a Penning trap. Since there is no Penning-trap, there is negligible removal of particles exiting the vacuum chamber. At 705, the drive voltage is turned on or up to establish a Penning trap. There will be a transition before the current stabilizes. Once the current stabilizes, the stable current and, in some cases, its temporal characteristic features are measured at 706. This results in a datapoint or set of transient datapoints consisting of a duration that the Penning trap was down, the drive voltage when the Penning trap was on and the current and/or pressure calculated from the stabilized current or the characteristic data points.

The duration of the OFF state at 704 is typically much longer than the duration of the ON state at 705-706. The latter can be short enough so that any pressure rise during 704 is not significantly offset by the pumping. For example, the OFF cycles can last from 1-24 hours, while the ON cycles can last from 1 second to 60 minutes. Note that actions 702 and 703 may be omitted so that, once equipment is set up at 701, process 700 continues at 704 with an OFF cycle.

At 707, a determination is made whether the data (in the form of datapoints) is sufficient for a flow rate measurement of the desired precision. In the case that the data is not sufficient, a determination of the next OFF duration is made at 708. The smaller the differential between the two most-recently determined currents/pressures, the longer the duration will be needed to ensure a sufficient signal-to-noise ratio. The longer duration can be implemented in a single repetition of steps 704-706, or, for additional reliability, by using more short OFF durations. A machine learning or prescribed randomization of long and short periods or algorithmic searches such as a binomial search can also help to decouple trends with ever increasing or decreasing off cycles from actual pressure changes. When, at 709, a determination is made that the data is sufficient, flow rate can be determined from the increase in pressure determined from an increase in measured current. For example, the first duration can be an hour, and the second duration can be one hour, four hours, twelve hours, or more depending on the differential obtained during the first iteration.

Figure 8:
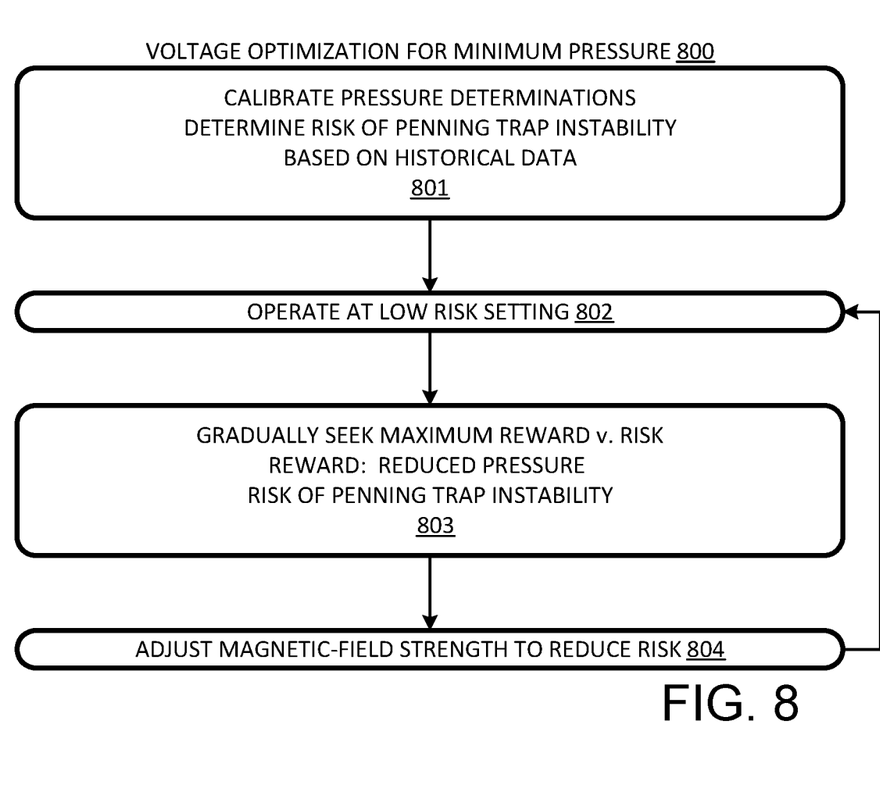
FIG. 8 is a flow chart of a process for optimizing voltage to achieve minimum pressure, the process being applicable to the sputter ion-pump system of FIG. 1.

Process 800, flow-charted in FIG. 8 FIG. 8, provides for seeking a minimum pressure (maximum vacuum) setting; if the minimum pressure would risk instability or collapse of the Penning trap, a reward-versus-risk determination can be used to find an optimum tradeoff. At 801, for each of plural combinations of drive voltage and measured current, the associated pressure and the risk of Penning trap instability can be determined. The pressure determinations can be calibrated using a calibrator 118. The instability risk can be determined by repeatedly lower the drive voltage under various pressures until the Penning trap becomes unstable or collapses; a likelihood of instability or collapse can then be determined for each voltage and current combination. At 802, the ion pump is operating at a (relatively) low-risk setting.

At 803, the drive controller gradually seeks a maximum reward-versus-risk setting. One approach to seeking is to dither the voltage and adjust the voltage appropriate to the lower pressure setting. As long as the risk of instability or collapse is zero or negligible, this seeking can continue until a pressure minimum is reached. If the seeking reaching settings associated with significant risk, a reward v risk tradeoff can be considered. For example, an increase in risk, e.g., of 1%, may be accepted if it is smaller than the decrease in pressure, e.g., 2%. Otherwise, the present setting is retained. Alternatively, a maximum risk setting can place a hard limit on the seek. Note that a higher risk of instability or collapse may be acceptable if historical data indicates that a lower average pressure over time can be achieved despite occasional instabilities. In other words, the evaluation of the reward is evaluated over time rather than instantaneously. For a similar subsequent run, the magnetic-field strength can be adjusted at 804 to reduce risk at or near optimal voltage; process 800 can then return to 802 for the subsequent run.

Figure 9:
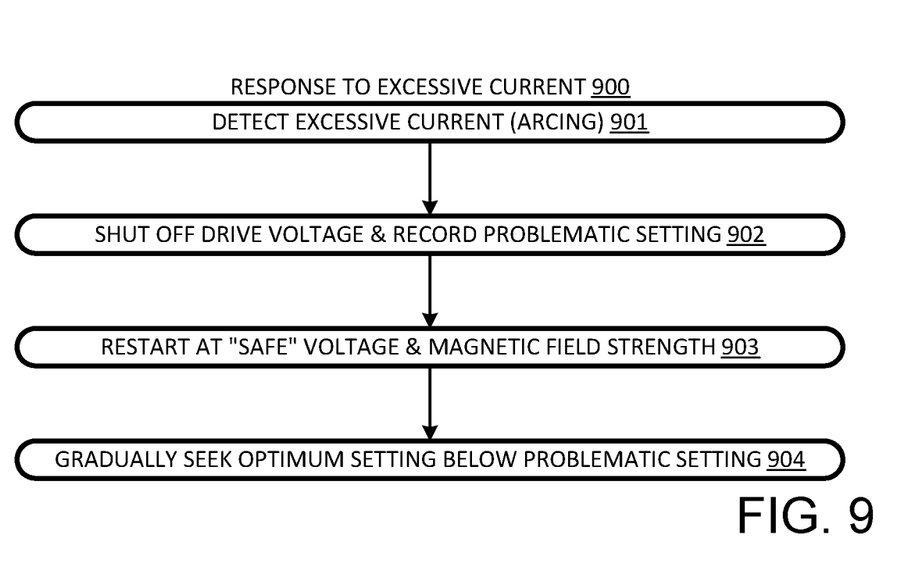
FIG. 9 is a flow chart of a process for responding to an excessive current, the process being applicable to the sputter ion-pump system of FIG. 1.

A process 900 for responding to excessive current is flow charted in FIG. 9. At 901, an excessive current is detected, e.g., a current indicating arcing. At 902, the drive voltage is turned off and the problem setting is recorded in that the voltage and the current at the time of detection is recorded. After a predetermined time or after manual restarting, at 903, the drive voltage is set at a safe level, high enough to establish a Penning trap but below the recorded problematic voltage; the magnetic-field strength may also be adjusted at 903 to make it easier to select a safe voltage. At 904, an optimum setting is gradually sought, with an upper limit below the problematic voltage setting.

In general, the processes of FIGS. 3-9 provide for actions and responses with user definable values and flats that enable or refine adaptability to the desired result and vacuum chamber. The automated responses can have the ability to script or call modules for user custom recipes or operational modes that selectively utilize all or part of any given response module. Some automated responses can notify a user, e.g., via email, text message, or other means. Also, the automated systems can await remote commands or parameters before proceeding with a response. Further, the automated system may use remote commands or parameters to temporarily override adjustments to parameters; for example, in the case of the user performing an action intended to mimic a problem, that action should not be used to adjust long term operating parameters.

Some embodiments include a periodic operation mode in which the pump is turned on for short durations at optimal voltage burst curves to achieve maximum pumping efficiency and to prolong ion pump lifetimes. This can be especially useful for small vacuum cells that may have very limited pumping hours. In a scenario, a user has enabled flags for periodic leak checks if it has cause. The pressure optimizer routine notices that the pressure is very slowly going up at the target voltage even when it raises the target voltage and waits for a few days. If the user has enabled the flag, then the optimizer could call a special leak check routine to see if a leak is probably at a leak rate that corresponds to the observed pressure rise.

Some embodiments include an algorithmic analysis or machine learning of data to suggest to the user a relative change in magnetic field in order to improve pump performance, for example, by impedance matching the pump load to the capabilities of the controller. For instance, if a system has become heavily loaded and the controller notes that a maximum current is reached at the minimum drive voltage, lowering the magnetic field for a period may allow the pump to more efficiently recover pressures to a point where the magnetic field may then be switched back to more optimally achieve lower pressures. Likewise, after long term operation with periodic or frequent stability issues, if the controller has reached its upper voltage limit established by the driver or arcing, the algorithmic analysis may suggest an increase in magnetic field of a relative or calculated percentage to improve pumping performance at lower voltages.

The approach of adjusting voltage as a function of an ionization-field current can be applied to a magnet-less high-voltage direct electron ionization type vacuum pump where the anode and cathode are connected to hot or cold cathode type emitters for the purpose of directly ionizing and pumping gasses. Such a system can include programmability and machine learning described above. A large base current may be subtracted from the direct emitter-collectors and they may have a secondary emitter/collector to detect captured ions.

Ion pump controllers equipped with IoT (Internet of Things) capable chips can stream data to the internet. This way a central control (brain) can use Artificial Neural Network Algorithms to extract patterns from the collective data transmitted by all of these units and train them based on this. Therefore as one ion pump controller has an experience, e.g., encounters a new I-V (current-voltage) region, the other ion pumps can learn about that without having their own experience. Also, as other versions of ion pump controllers come online, the central brain can record all these patterns and extract deep I-V characteristics related to ion pumps. To observe and extract deep patterns (physics) about ion pump controllers, large connected network can stream a lot of data from which trained machines can extract and learn patterns (physics in this case).

Herein, "seek" means locating an optimal setting by evaluating a series of settings. In the present case, "optimal" can encompass settings that minimize current, minimize pressure, and minimize a risk-versus-reward parameter in which the reward is lower pressure while the risk is of arcing or Penning trap instability or collapse.

Herein, the total flow of material into a sputter ion pump can include load, out-gassing, and leakage. The "load" is the flow component due to materials intentionally introduced as part of an application (e.g., atomic clock) or experiment. Leakage is the flow component due to gases like helium permeating or entering via a defect from the ambient into a vacuum through an object, e.g., a vacuum chamber wall. Outgassing includes a component due to particles unintentionally escaping from solid or liquid material into the vacuum.

Herein, all art labeled "prior art", if any, is admitted prior art; all art not labeled "prior art" is not prior art. The foregoing embodiments, as well as modifications thereto and variations thereof, are within the scope of the following claims.

What is claimed is:

1. An ion-pump system comprising:
   a sputter ion pump having an anode and a cathode set including at least one cathode, the sputter ion pump having a magnetic-field source for generating a magnetic field that cooperates with a voltage differential to establish and maintain a Penning trap; and
   an ion-pump drive for providing the voltage differential between the anode and the cathode set, the ion-pump drive including:
      a voltage generator coupled to the sputter ion pump for providing the voltage differential between the anode and the cathode set,
      a current sensor for measuring a Penning-trap current through the Penning trap, and
      a drive controller coupled to the current sensor and the voltage generator for adjusting the voltage differential provided by the voltage generator with a drive function based on variables including the present voltage differential and of the measured Penning-trap current.

2. The ion-pump system of claim 1, wherein the ion-pump drive includes a voltage sequencer for stepping through a series of drive voltage differentials, the current sensor providing a Penning-trap current measurement for each drive voltage differential.

3. The ion-pump system of claim 2, wherein the stepping through the series of drive voltage differentials results in a series of datapoints including voltage-differential values and Penning-trap current values.

4. The ion-pump system of claim 3, wherein the drive controller determines the drive function based on the series of datapoints.

5. The ion-pump system of claim 4, wherein the drive controller determines the drive function in part by identifying voltage differentials at which the Penning-trap becomes unstable or collapses.

6. The ion-pump system of claim 3, wherein the ion-pump drive includes a machine-learning engine that adjusts the drive function based on the series of datapoints or based on operator adjustments to the voltage differential.

7. The ion-pump system of claim 3, wherein the series of datapoints also includes magnetic field strength values and the drive controller adjusts the voltage differential as a function of the strength of the magnetic field.

8. The ion-pump system of claim 7, wherein the drive controller adjusts the magnetic field strength in part based on the drive function.

9. A system comprising non-transitory media encoded with code that, when executed by a processor, implements a process including:
   applying a drive voltage between an anode and a cathode of an ion pump for providing a voltage differential that cooperates with a magnetic field in the ion pump to establish a Penning trap;
   measuring a Penning-trap current across the Penning trap;
   adjusting the voltage differential according to a drive function that is based on variables including the present voltage differential and the measured Penning-trap current.

10. The system of claim 9, wherein the drive function is also a function of the magnetic-field strength of the magnetic field.

11. The system of claim 9, further comprising determining pressure based on the Penning-trap current.

12. The system of claim 9, further comprising stepping the drive voltage through a range of voltage differentials capable of establishing the Penning trap and measuring the corresponding Penning-trap current at each step to acquire a set of datapoints associating the Penning-trap currents with the range of voltage differentials capable of establishing the Penning trap.

13. The system of claim 12, further comprising setting the drive function based on the acquired set of datapoints.

14. The ion-pump process of claim 13, wherein the setting the drive function involves identifying a first voltage-differential threshold above which arcing occurs and a second voltage-differential threshold below which the Penning trap becomes unstable or collapses.

15. The system of claim 9, wherein the process further includes using machine learning to set the drive function.

* * * * *